United States Patent [19]

Kelso

[11] Patent Number: 4,901,958

[45] Date of Patent: Feb. 20, 1990

[54] APPARATUS AND METHOD FOR SUSPENDING PIPE RACK

[76] Inventor: Michael V. Kelso, 27 Hornsilver Pl., The Woodlands, Tex. 77381

[21] Appl. No.: 255,589

[22] Filed: Oct. 11, 1988

[51] Int. Cl.[4] ............................................. F16L 3/00
[52] U.S. Cl. .................................................... 248/59
[58] Field of Search ...................... 248/58, 59, 62, 65, 248/68.1, 70, 74.1, 323, 327; 52/698, 699, 704; 29/26.1; 411/433, 432, 266, 267, 268, 269, 270

[56] References Cited

U.S. PATENT DOCUMENTS

| | | | |
|---|---|---|---|
| 1,082,993 | 12/1913 | Beattie | 411/433 |
| 1,189,208 | 6/1916 | Hodkinson | 248/68.1 |
| 2,026,312 | 12/1935 | Houts | 248/68.1 |
| 2,353,443 | 7/1944 | Carpenter | 248/68.1 |
| 2,377,581 | 6/1945 | Shaffrey | 411/433 |
| 2,380,379 | 7/1945 | Attwood | 411/112 |
| 2,664,023 | 12/1953 | Mugford | 411/433 |
| 2,801,064 | 7/1957 | Callahan | 248/68.1 |
| 2,880,949 | 4/1959 | Fuss | 248/70 |
| 2,882,781 | 4/1959 | Gates | 411/432 |
| 3,547,385 | 12/1970 | Kindorf | 248/62 |
| 3,854,684 | 12/1974 | Moore | 248/59 |
| 3,866,871 | 2/1975 | Duprey, Sr. | 248/59 |
| 3,960,350 | 6/1976 | Tardoskegyi | 248/59 |
| 4,037,098 | 7/1977 | Kowalski | 248/323 |
| 4,132,146 | 1/1979 | Uhlig | 411/433 |
| 4,274,323 | 6/1981 | Resnicow | 411/433 |
| 4,462,731 | 7/1984 | Rovinsky | 411/433 |
| 4,556,352 | 12/1985 | Resnicow | 411/433 |
| 4,575,295 | 3/1986 | Rebentisch | 411/85 |

FOREIGN PATENT DOCUMENTS

| | | | |
|---|---|---|---|
| 2437756 | 3/1975 | Fed. Rep. of Germany | 411/433 |
| 561892 | 8/1923 | France | 411/433 |
| 726374 | 4/1980 | U.S.S.R. | 411/432 |
| 2080904 | 2/1982 | United Kingdom | 411/174 |

OTHER PUBLICATIONS

"Chan-All Sections", Modern Hanger Corp. Catalog, 1953, page 88.

Primary Examiner—Ramon O. Ramirez
Assistant Examiner—Robert A. Olson
Attorney, Agent, or Firm—Neal J. Mosely

[57] ABSTRACT

A method of suspending a pipe rack assembly from one or more vertical threaded shafts without passing the assembly over the ends of the shafts utilizes vertically opposed U-shaped channel members each having a plurality of transverse slots extending transversely inward from opposite side walls which are placed laterally on the shafts then slidably received one on the other and secured in the overlapped position with threaded fasteners. The vertically spaced slots in the upper and lower channel members form a circular opening which surrounds the shaft. The assembled channels are supported on the shafts by split nut members having two separable internally threaded segments which encircle the shaft and are releasably joined together on the shafts as a single unit to engage the bottom surface of the lower channel member. The split nuts allow adjustment and leveling of the assembled channel members at the proper height. The channel assemblies form a plurality of generally parallel spaced channel assemblies capable of receiving and supporting pipes, cables, and the like thereon. The channel members may be installed above existing pipe racks on the same supporting shafts without the necessity of removing the existing pipe racks.

19 Claims, 1 Drawing Sheet

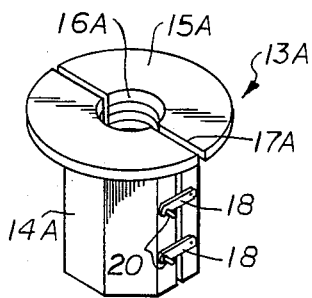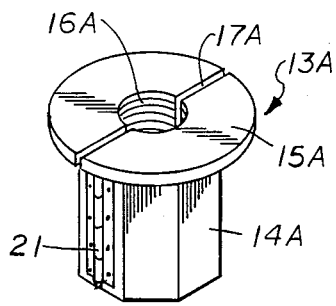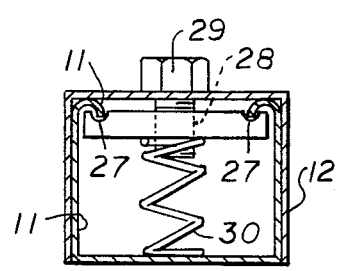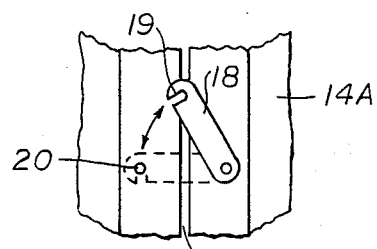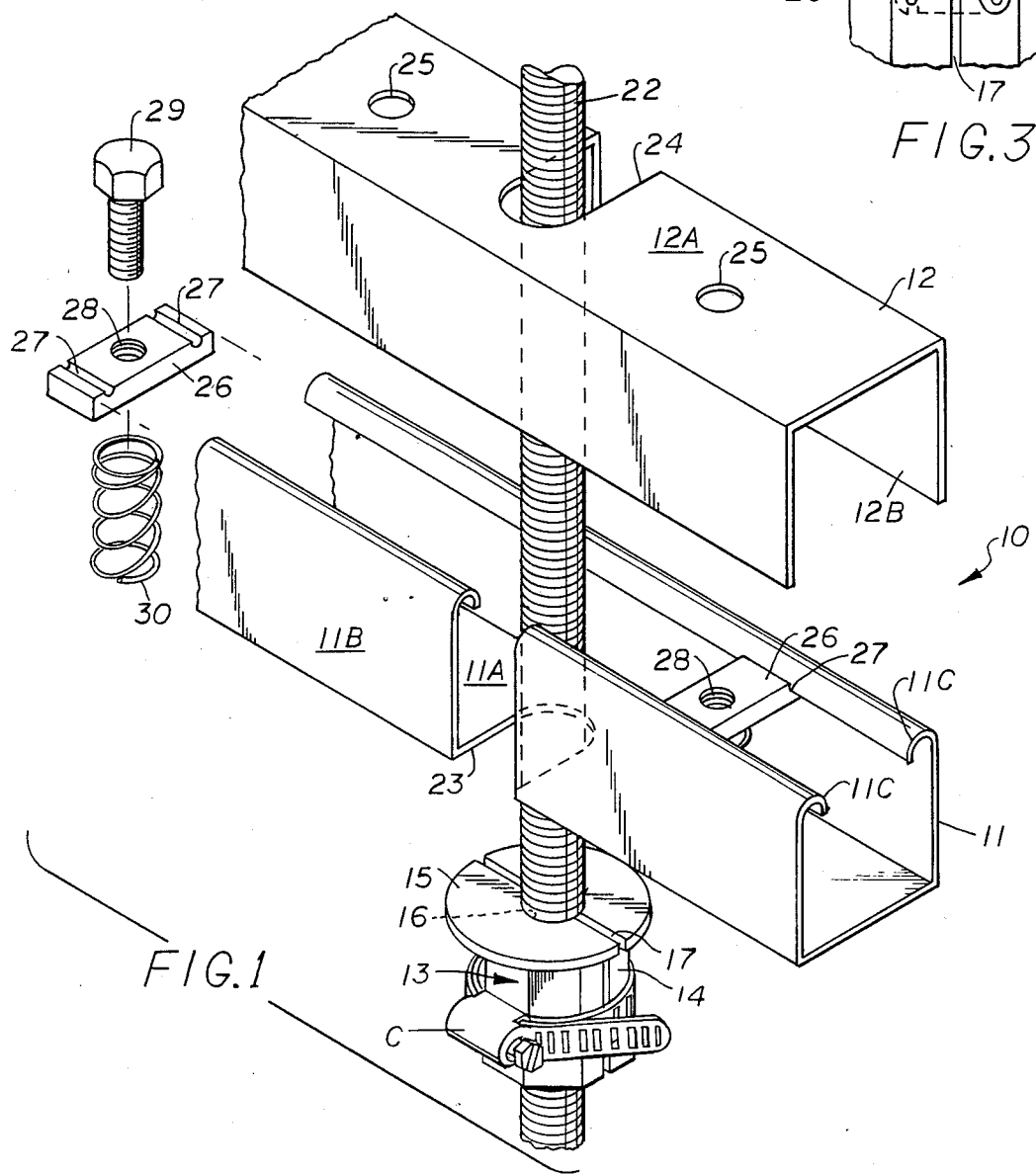

APPARATUS AND METHOD FOR SUSPENDING PIPE RACK

BACKGROUND OF THE INVENTION

1. Field of the Invention

This invention relates generally to suspended pipe rack apparatus, and more particularly to a method and apparatus for suspending a pipe rack from vertical shafts without passing the assembly over the ends of the shafts.

2. Brief Description of the Prior Art

Architectural improvements and additions are constantly made in commercial and industrial buildings. One of the common problems encountered in changing the architectural construction is the removal or addition of suspended pipe racks. The pipe rack is a system of horizontally spaced channels suspended from the ceiling on a plurality of vertical threaded bars. The channel has a plurality holes through which the vertical rods are received as the channel is raised to the proper elevation. A washer and threaded nut is run up on the rod to engage the bottom of the channel and support the channel on the rod. Pipes and electrical cables are supported horizontally on the pipe rack channels and run horizontally overhead throughout the building.

When architectural improvements, additions, or changes require new pipe or electrical hook-ups or re-routing, the suspended pipes or electrical cables must be removed or replaced, or new ones added. This procedure often requires expensive periods of shut-down while the pipe racks are disassembled. In some cases, a second layer or intermediate pipe rack may be installed above the existing one to allow placement of the new pipe or cable before the old ones are removed.

To install an intermediate pipe rack above an existing one, it is necessary to remove the old channel from the vertical threaded rod, or to back off the nut and lower the channel. The intermediate channel must then be forced over the existing pipe and cable which often requires bending or cutting existing support rods to allow the intermediate channel to fit on the rods above the pipe and cable and then the old lower channel must be put back into position. The threading procedure alone takes many hours.

It would therefore be desirable to provide a method and apparatus for suspending pipe racks without the necessity of removing any members already in place utilizing interlocking channels and split nuts. Split nut devices are known in the art. There are several patents which disclose various split nut constructions.

Uhlig, U.S. Pat. No. 4,132,146 discloses a pivotally interconnected split nut.

Rovinsky et al, U.S. Pat. No. 4,462,731 discloses a split nut assembly wherein the nut is divided into two separate equal parts, and a hollow shell which is also equally divided. The parts are assembled with the parting lines offset by 90°.

Resnicow, U.S. Pat. No. 4,556,352 discloses a split nut having a snap lock configuration.

Resnicow, U.S. Pat. No. 4,274,323 discloses a split nut having interlocking pieces and also with an end washer feature.

Wrensch, U.S. Pat. No. 663,208 discloses a split nut which is hinged at one end and the jaws are secured together with a screw.

Shaffrey, U.S. Pat. No. 2,377,581 discloses a divided or split nut in four pieces.

Hindman, U.S. Pat. No. 3,038,366 discloses a split nut which is secured together by a wire clip.

German Pat. No. 1,144,542 discloses a split nut wherein the two halves have an arcuate tongue configuration.

English Pat. No. 455,165 discloses split nut having a dove tail tongue and groove interlock which slides together.

The present invention is distinguished over the prior art in general, and these patents in particular by a method and apparatus for suspending a pipe rack assembly from one or more vertical threaded shafts without passing the assembly over the ends of the shafts which utilizes vertically opposed U-shaped channel members each having a plurality of transverse slots extending transversely inward from opposite side walls that are placed laterally on the shafts then slidably received one on the other and secured in the overlapped position with threaded fasteners. The vertically spaced slots in the upper and lower channel members form a circular opening which surrounds the shaft. The assembled channels are supported on the shafts by split nut members having two separable internally threaded segments which encircle the shaft and are releasably joined together on the shafts as a single unit to engage the bottom surface of the lower channel member. The split nuts allow adjustment and leveling of the assembled channel members at the proper height. The channel assemblies form a plurality of generally parallel spaced channel assemblies capable of receiving and supporting pipes, cables, and the like thereon. The channel members may be installed above existing pipe racks on the same supporting shafts without the necessity of removing existing pipe racks.

SUMMARY OF THE INVENTION

It is therefore an object of the present invention to provide a method and apparatus for suspending a pipe rack assembly from one or more vertical threaded shafts without passing the assembly over the ends of the shafts.

It is another object of this invention to provide a method and apparatus for suspending a pipe rack assembly above an existing pipe rack without the necessity of removing the existing pipe rack.

Another object of this invention is to provide a method and apparatus for suspending a pipe rack assembly which greatly reduces the time and labor required to assemble, install, disassemble, and modify a suspended pipe rack system.

Another object of this invention is to provide a split nut apparatus which may be easily and quickly secured on a shaft without passing the nut over the end of the shaft.

Another object of this invention is to provide a separable channel assembly which may be installed on one or more shafts without passing the assembly over the ends of the shafts so as to permit quick and easy installation and removal.

A further object of this invention is to provide a method and apparatus which will reduce expensive shut-down time for removal, replacement, or re-routing of pipes, cables and the like which are supported on a suspended pipe rack system.

A still further object of this invention is to provide a pipe rack assembly which is simple in construction, economical to manufacture, and sturdy and reliable in use.

Other objects of the invention will become apparent from time to time throughout the specification and claims as hereinafter related.

The above noted objects and other objects of the invention are accomplished by the present method and apparatus for suspending a pipe rack assembly from one or more vertical threaded shafts without passing the assembly over the ends of the shafts which utilizes vertically opposed U-shaped channel members each having a plurality of transverse slots extending transversely inward from opposite side walls that are placed laterally on the shafts then slidably received one on the other and secured in the overlapped position with threaded fasteners. The vertically spaced slots in the upper and lower channel members form a circular opening which surrounds the shaft. The assembled channels are supported on the shafts by split nut members having two separable internally threaded segments which encircle the shaft and are releasably joined together on the shafts as a single unit to engage the bottom surface of the lower channel member. The split nuts allow adjustment and leveling of the assembled channel members at the proper height. The channel assemblies form a plurality of generally parallel spaced channel assemblies capable of receiving and supporting pipes, cables, and the like thereon. The channel members may be installed above existing pipe racks on the same supporting shafts without the necessity of removing the existing pipe racks.

BRIEF DESCRIPTION OF THE DRAWINGS

FIG. 1 is an exploded isometric view of a portion of a pipe rack system utilizing an interlocking channel and split nut apparatus in accordance with the present invention.

FIG. 2 is an isometric view of another split nut member of the present, invention having a latch mechanism.

FIG. 3 is a partial elevation showing the split nut latch mechanism in larger scale.

FIG. 4 is an isometric view of the split nut member of FIG. 2 showing the hinge mechanism.

FIG. 5 is a transverse cross section of the pipe rack system in the assembled condition.

DESCRIPTION OF THE PREFERRED EMBODIMENT

Although the following description describes the invention being utilized particularly in suspended pipe rack installations, it should be understood that the apparatus may be used in various other construction applications.

Referring to the drawings by numerals of reference, there is shown in FIG. 1, a preferred pipe rack assembly 10 which utilizes overlapping channels 11 and 12 and split nuts 13 The split nut 13, as shown in FIG. 1, comprises a segmented hexagonal body portion 14 and may have a radial disk-shaped flange portion 15 at the top which serves as a washer. Split nut 13 has internal threads 16 and is cut into two segment halves through two opposite flat surfaces by a longitudinal cut 17 extending through opposite sides across the axial center of the nut. The two nut segments are releasably joined together as a single unit by a strap-type hose clamp C.

Another split nut 13A is shown in FIGS. 2, 3, and 4, which has a latch mechanism. The split nut 13A comprises a segmented hexagonal body portion 14A with a radial disk-shaped flange portion 15A at the top which serves as a washer. The split nut 13A has internal threads 16A and is cut into two segment halves through two opposite flat surfaces by a longitudinal cut 17A extending through opposite sides across the axial center of the nut.

One or more small latch members 18 formed of a flat rectangular strap have one end pivotally connected to one nut segment half and their other end has a slot 19 (FIG. 3) which releasably engages a small projection 20 on the other nut segment. Each latch member 18 extends across the cut 17 and in the engaged position locks the segments together as a single unit. Opposing sides of the nut 13A may be provided with one or more latches whereby the nut halves may be completely separated. Alternatively, as shown in FIG. 4, the cut side of the nut opposite the latch 18 may be hingedly connected with a hinge 21 in which case the two nut halves may be pivotally opened.

The nut halves are installed on a vertical threaded shaft 22 by placing them around the shaft and then sliding clamp C onto the segments and tightening the clamp with a screwdriver, or by latching the small latch members 18 to maintain the nut in threaded engagement with the threaded shaft as a single unit. The assembled nut can then be threaded up or down on the shaft 22 in the conventional manner or quickly removed by unfastening the clamp C or latches 18 and pulling the nut halves apart.

Referring now to FIGS. 1 and 5, the split nut 13 or 13A is used to support a pair of vertically opposed overlapped channel members to form a suspended pipe rack. The channel assembly comprises two elongate U-shaped channel members 11 and 12. The upper channel 12 is slightly wider than the lower channel 11 to be slidably received thereon in inverted vertical relation. Each channel 11 and 12 has a plurality of slots 23 and 24 in the top and bottom surfaces 11A and 12A respectively which extend inward a distance from their opposite side walls 11B and 12B. The transverse slots 23 and 24 may be formed in the channel members when they are manufactured, or the channel members may be without slots and the slots formed in the channels at the job site to correspond to the size and spacing of the existing shafts. The top channel 12 has a plurality of longitudinally spaced holes 25 through its top wall.

The lower channel member 11 has an inwardly rolled top edge 11C which extends longitudinally the length of the channel. A plurality of flat rectangular straps 26 are received within the lower channel member 11. The width of each strap 26 is smaller than the distance between the opposed rolled edges 11C and its length is greater than the distance between the rolled edges such that the strap 26 may be aligned longitudinally with the lower channel member 11 and inserted therein and then turned 90° to engage the underside of rolled edge 11C. Strap 26 may have grooves 27 near the long ends to receive rolled edge 11C. A threaded hole 28 extends through the center of each strap 26 to receive the shaft of a bolt 29. A compression spring 30 extends between the bottom of strap 26 and the bottom wall surface of lower channel 11 to bias the strap in engagement on rolled edge 11C.

It should be understood, that other types of fasteners other than the straps may be used to secure channel members together. For example, a bolt may be inserted through holes provided in each channel member and a nut installed on one end. Also, a threaded hole may be provided in the lower channel member to threadedly receive a bolt installed through a hole in the upper channel member.

INSTALLATION

To install the pipe rack apparatus, the split nuts 13 or 13A are installed on the threaded rods or shafts 22 at the approximate location by opening the segments and placing them around the shaft and then installing the clamp C and tightening it with a screwdriver, or by latching the small latch members 18 to maintain the nut in threaded engagement on the threaded shaft 22 as a single unit. The assembled nut can then be threaded up or down on the shaft in the conventional manner or quickly removed by unfastening the latches 18 and pulling the nut halves apart.

If the transverse slots 23 and 24 are not formed in the channel members when they are manufactured, the slots are cut in the channel members to correspond to the size and spacing of the shafts at the job site.

The straps 26 are installed in the lower channel 11 prior to raising it into position. The compression springs 30 are placed in the lower channel 11 and the straps 26 are aligned longitudinally with the lower channel and pushed down on the springs and then turned 90° to engage the underside of the rolled edge 11C. The springs 30 will bias the straps 26 in place until assembly is completed.

The lower channel 11 is raised into position and laterally moved until the threaded shaft 22 is received in the slots 3 and the channel 11 is then lowered onto the installed split nut 13 or 13A. The upper channel 12 is raised into inverted position above the lower channel 11 and moved laterally until the same shafts suspending it are received in the slots 24. In this position, the slots 24 are laterally opposed to the slots 23 of the lower channel member. The upper channel 12 is then lowered vertically to slide over the lower channel 11 whereby the opposed slots define a circular opening through the opposed top and bottom surfaces of the channel members to surround the threaded shafts 22.

If necessary, the straps 26 may be slidably repositioned along the length of channel 11 such that hole 28 is aligned with hole 25 in the top wall of upper channel 12. Bolts 29 are then installed through the holes 25 in the top surface 12A of upper channel member 12 and threadedly engaged in the threaded holes 28 of the straps 26. The bolts 29 are tightened to clamp the channel members together to prevent them from being accidentally separated. The split nuts may be turned by hand or with a wrench to adjust their position to level the assembled channel members at the proper height. The steps are then repeated to install additional channel assemblies on other ones of said shafts to form a plurality of generally parallel spaced channel assemblies capable of receiving and supporting pipes, cables, and the like thereon.

When it becomes necessary to remove the pipe rack assembly, the split nuts can be quickly removed by unfastening the latches and opening the segments, allowing the assembled channels to slide off the end of the shafts. If there is an obstruction beneath the channel assembly, the bolts 29 can be undone allowing the channel members to be separated and removed laterally from the shafts.

The above described apparatus and method provides a pipe rack system which may be installed as original equipment to become the primary pipe rack or may be easily and quickly be installed as an intermediate or upper rack above existing pipe racks without the necessity of removing any members already in place.

While this invention has been described fully and completely with special emphasis upon a preferred embodiment, it should be understood that within the scope of the appended claims the invention may be practiced otherwise than as specifically described herein.

I claim:

1. An interlocking pipe rack assembly for mounting on one or more shafts without passing over the end of the shafts comprising;

two elongate separable channel members, each said channel member having slots extending transversely inward from longitudinal side edges thereof, said channel members being adapted for assembly together on a shaft with the slots of each channel member overlapped in laterally opposed relation to form a pair of generally circular openings surrounding a shaft received therein and extending completely therethrough, and fastening means for relasably securing said channel members together in the assembled condition adapted to surround said one or more shafts.

2. An interlocking pipe rack assembly according to claim 1 in which said elongate channel members comprise a first U-shaped channel member, and a second inverted U-shaped member slidably received on said first channel member in opposed relation, and said slots extend transversely inward from one longitudinal side wall of each said U-shaped channel member.

3. An interlocking pipe rack assembly according to claim 2 in which said first channel member and said second channel member are adapted to be positioned in vertically opposed and laterally opposed relation on one or more vertically extending shafts, when assembled, such that each shaft is received in the laterally opposed slots, and said channel members are slidably received one on the other in opposed relation such that each shaft is surrounded by the overlapped slots after assembly thereon.

4. An interlocking pipe rack assembly according to claim 3 in which said fastening means comprises one or more threaded fasteners operatively connected through apertures in said channel members to releasably join them together.

5. An interlocking pipe rack assembly according to claim 4 in which said fastener means comprises a threaded fastener having a threaded shaft with an enlarged head at one end, said second channel member has a series of longitudinally spaced holes therein of smaller diameter than said enlarged head for slidably receiving said threaded shaft, and said first channel member is adapted to engage said threaded shaft on assembly for securing said channel members in the assembled condition.

6. An interlocking pipe rack assembly according to claim 5 in which the side walls of said U-shaped first channel member side walls have inwardly facing opposed top edges which extend longitudinally the length of the channel, and one or more flat rectangular straps having a central threaded aperture are received within the first channel member beneath said opposed top edges and threadedly receive the threaded shaft of said fastener, whereby said channel members are clamped together by said threaded fasteners.

7. An interlocking pipe rack assembly according to claim 6 including a compression spring positioned between the bottom of each said strap and the bottom wall of said first channel member to bias said strap into engagement on said inwardly facing opposed top edges, whereby said straps may be pre-assembled within said lower channel member prior to placing said channel in position on said one or more shafts.

8. An interlocking pipe rack assembly according to claim 1 including a split nut assembly for mounting on said one or more shafts without passing over the end of the shaft comprising;

two separable segments which are sized and shaped to encircle the shaft when mounted thereon and having a series of sides disposed at equal angles to one another and at equal distances from the center of the nut, said segments separated along a longitudinal cut extending through opposite sides across the axial center of the nut, and said segments being releasably joined together by fastener means spanning said longitudinal cut on at least one side to secure said segments into a single unit.

9. An interlocking pipe rack assembly according to claim 8 in which said fastener means joining said segments together is an adjustable clamp encircling the sides of said segments.

10. An interlocking pipe rack assembly according to claim 9 in which each said segment has a body which defines part of a bore for the reception of the shaft, and an external semi-circular flange extending radially outward at one end thereof perpendicular to the bore axis, said semi-circular flanges forming a complete circle to serve as a washer when said segments are joined together.

11. An interlocking pipe rack assembly according to claim 10 in which said segments are internally threaded.

12. An interlocking pipe rack assembly according to claim 8 in which said fastener means comprises latch means spanning said longitudinal cut on at least one side to secure said segments into a single unit.

13. An interlocking pipe rack assembly according to claim 12 in which said segments have a hinge securing them together on the side opposite said latch means.

14. An interlocking pipe rack assembly according to claim 12 in which said latch means comprises one or more flat rectangular straps having one end pivotally connected to the side surface of one said segment and their other end having a slot to releasably engage a small projection on the side surface of the laterally adjacent segment, each latch extending across the longitudinal cut in the engaged position.

15. A method of suspending a pipe rack assembly from one or more threaded vertical shafts without passing the assembly over the end of the shafts comprising the steps of;

providing a plurality of split nut members each comprising two separable segments sized and shaped to encircle a shaft and capable of being releasably joined together on a shaft as a single unit, providing a plurality of elongate lower U-shaped channel members having a plurality of slots extending transversely inward from one longitudinal side wall and upper inverted U-shaped channel members having a plurality of slots extending transversely inward from another longitudinal side wall and fitting in telescopic relation, opening the split nut assemblies and placing the segments around each shaft and joining them together as a single unit on said shafts at about the desired height, placing the lower channel member at a desired height into position laterally against one or more vertical shafts with the shafts received in the slots and the bottom surface of the channel supported on the split nut, placing the upper channel member into position laterally against same said shafts in vertically opposed relation above the lower channel member with the slots of the upper member in laterally opposed relation to those of the lower channel member, sliding the upper channel member vertically downward over the lower channel member whereby said opposed slots define a circular opening through the opposed top and bottom surfaces of said channel members which surrounds said shafts, securing said assembled channel members together with fasteners, adjusting the vertical position of the split nut assemblies to level the assembled channel members at the proper height, and repeating the above recited steps to install additional channel assemblies on other shafts to form a plurality of generally parallel horizontally spaced channel assemblies for receiving and supporting pipes, cables, and the like thereon.

16. The method according to claim 15 including the additional steps of;

repeating the steps to install additional channel assemblies vertically above the previously installed channel members on the same said shafts to form a vertically spaced second tier of a plurality of generally parallel horizontally spaced channel assemblies capable of receiving and supporting additional pipes, cables, and the like thereon.

17. The method according to claim 15 in which the step of securing said assembled channel members together with fasteners comprises;

installing one or more threaded fasteners through apertures in said lower and upper channel members to releasably join them together.

18. The method according to claim 15 in which the steps are carried out to install additional channel assemblies vertically above existing pipe rack assemblies on the same supporting shafts to form a vertically spaced second tier of a plurality of generally parallel horizontally spaced channel assemblies capable of receiving and supporting additional pipes, cables, and the like thereon without the need to remove the existing pipe rack assemblies.

19. The method according to claim 18 in which
the vertical shafts are threaded, and
each said split nut segment has a body which defines part of a threaded bore for the reception of the shaft, and
said step of adjusting the vertical position of the split nut assemblies to level the assembled channel members at the proper height comprises screwing the installed split nut assemblies up or down on the vertical shaft.

* * * * *